United States Patent [19]
Swanberg

[11] 3,777,578
[45] Dec. 11, 1973

[54] LINEAR ACTUATOR
[75] Inventor: Melvin E. Swanberg, Claremont, Calif.
[73] Assignee: Xerox Corporation, Stamford, Conn.
[22] Filed: May 22, 1972
[21] Appl. No.: 255,364

[52] U.S. Cl. .................................................. 74/89
[51] Int. Cl. ............................................. F16h 25/12
[58] Field of Search ........................... 74/89, 25, 27

[56] References Cited
UNITED STATES PATENTS
| | | | |
|---|---|---|---|
| 3,425,284 | 2/1969 | Shelton | 74/25 |
| 2,215,678 | 9/1940 | Weathers | 74/25 |
| 2,940,322 | 6/1960 | Uhing | 74/25 X |
| 3,394,599 | 7/1968 | Tucker | 74/25 |
| 2,619,346 | 11/1952 | Weathers | 74/89 |

Primary Examiner—Charles J. Myhre
Assistant Examiner—F. D. Shoemaker
Attorney—James J. Ralabate et al.

[57] ABSTRACT

A linear actuator for converting rotary motion into rectilinear motion which includes a plurality of rollers mounted in a two section carriage and supported thereby for engagement with a drive shaft, the axes of the plurality of rollers being disposed at an angle relative to the drive shaft axis whereby the frictional contact therewith causes rectilinear motion of the carriage upon the rotation of the drive shaft.

The upper section of the carriage includes a precision mounted roller maintained at an inclined angle to the shaft by preloaded bearings. The other rollers, or pressure rollers, are mounted in the lower section of the carriage and have sufficient moment freedom to self-align to the angle dictated by the precision roller. The pressure rollers, in a preferred embodiment, are crowned to their own diameter.

2 Claims, 5 Drawing Figures

LINEAR ACTUATOR

BACKGROUND OF THE INVENTION

Lead screws and their matching nut have been used in the prior art to convert rotary motion to linear motion. However, the use of a simple lead screw and nut, although providing smooth operation, is relatively poor in efficiency. A ball nut and its associated lead screw can provide high efficiency under heavy loads, but requires a precision ground thread and preloaded nuts if backlash and smooth operation is to be achieved for light load (and torque) applications. The principal disadvantages of such a device are the high cost, high wear rates, limited available rotational to translational ratios and high suseptibility to contamination, causing roughness.

In many applications where absolute repeatability of angular to linear position is not essential, and the consistency of the rotational to translational ratio required is moderate, a threadless lead screw can be more appropriately applied. This device operates on the principle that free-running rollers, engaging a smooth surfaced rotating shaft, having its axes inclined to the axis of that shaft, would be propelled in the direction of the shaft axis. An example of such a system is shown in U. S. Pat. No. 2,204,638.

The principle disadvantage of the prior art systems, as exemplified by the aforementioned U. S. Pat. No. 2,204,638, is that the inclined angle of each roller can only be maintained with a limited precision. For example, a lack of tightness in the rollers permits a degree of "steering" freedom. On the other hand, if all rollers were "tight," i.e., its inclined angle is not permitted to change, the inability of the rollers to adjust would cause a drag effect as each roller imparts its own, but different lead.

SUMMARY OF THE PRESENT INVENTION

The present invention provides a novel rotary to linear motion converter using a threadless lead screw, or drive shaft, which avoids the disadvantages of the prior art systems as set forth hereinabove.

The apparatus of the present invention utilizes a drive shaft, bearing supported at one end to a fixed base, with its axis aligned with the axis of freedom of the mechanism to be driven. A single "steering" roller is mounted on a carriage such to engage the shaft along its length as the carriage moves along its axis of freedom. The roller is inclined to the axis of the shaft by the angle defined by the equation, $\tan \theta = L/C$ where $\theta$ = angle of inclination $L$ = desired lead (inches per revolution)

$C$ = circumference of drive shaft (in inches)

This angle is maintained by precision mounting of the roller using preloaded bearings enabling the roller to resist radial, axial or moment movement.

In order to maintain pressure on the "steering" roller, two additional rollers are spring loaded against the shaft toward the steering roller. These rollers, being mounted on the carriage, and spaced 120° around the shaft, together with the steering roller, form the free end shaft support.

The spring loaded rollers, which apply pressure to the shaft and the steering bearing, have sufficient moment freedom such that the angle of inclination will be self-aligning to that angle dictated by the steering roller, thereby minimizing the possibilities of drag and lead errors. In another embodiment, the pressure rollers are crowned to their own diameter such that they present a spherical surface to the shaft. The use of this crown minimizes the effect of the non-symmetrical compression of the shaft and roller which generates forces to turn these rollers to a wrong lead angle, creating drag effects and lead angle errors.

The present invention allows the use of a single precision roller i.e., the steering roller, to determine the lead i.e., rotational to translational ratio. In addition, since the drive shaft is supported and self-aligning in two mountings (bearing at one end, inclined rollers on the other), it is not critical that the shaft be straight and parallel to the motion axis as with other methods.

It is the object of the present invention to provide an improved rotational to linear motion converter which utilizes a threadless drive shaft.

It is a further object of the present invention to provide an improved rotational to linear motion converter which utilizes a single steering roller which is precision mounted on a carriage for engaging a threadless drive shaft.

It is still a further object of the present invention to provide an improved rotational to linear motion converter which utilizes a rigidly mounted single steering roller mounted on a carriage for engaging a threadless drive shaft and a pair of pressure rollers which are spring loaded against the drive shaft and towards the steering roller, the pressure rollers having sufficient moment freedom such that their angle of inclination will be self-aligning to the angle dictated by the steering roller.

It is an object of the present invention to provide an improved rotational to linear motion converter which utilizes a threadless shaft, the shaft being bearing supported at one end and supported at the other end by inclined rollers.

It is still a further object of the present invention to provide an improved motion converter which utilizes a threadless drive shaft, a steering roller and a pair of pressure rollers which are crowned to their own diameter whereby a spherical surface is presented to the drive shaft.

BRIEF DESCRIPTION OF THE DRAWINGS

For a better understanding of the invention as well as other objects and further features thereof, reference is made to the following description which is to be read in conjunction with the accompanying drawings and wherein.

DESCRIPTION OF THE PREFERRED EMBODIMENT

Figure 1:
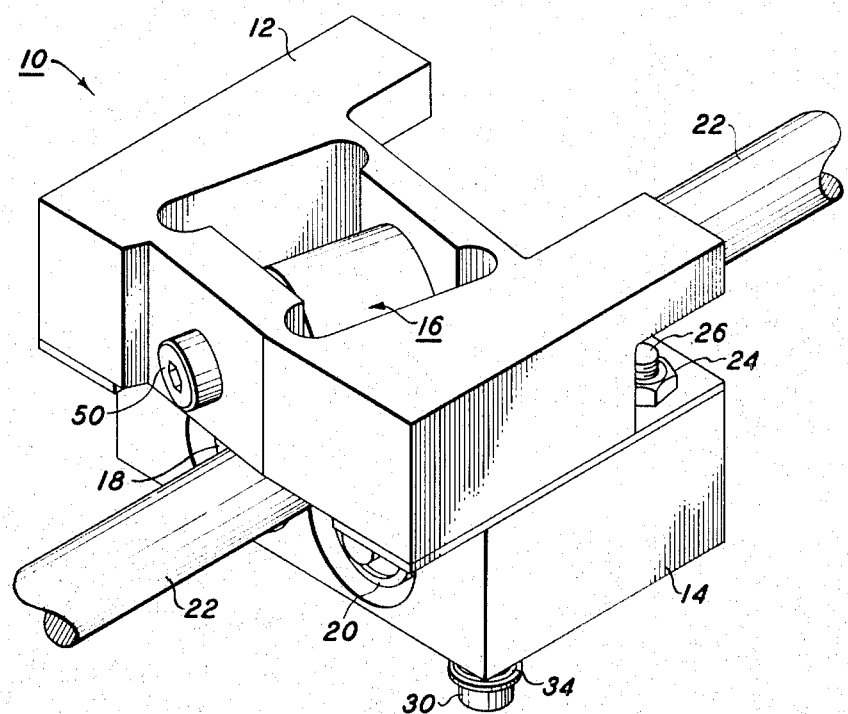
FIG. 1 is a perspective view of the linear actuator of the present invention.

Referring now to FIGS. 1 and 2A–C, the linear actuator comprises a carriage 10 comprising upper and lower portions 12 and 14, respectively. The upper section 12 includes a precision mounted steering roller 16 while the lower portion includes pressure rollers 18 and 20. The steering roller 16 is mounted by back-to-back preloaded bearings, as will be explained more fully hereinafter with reference to FIG. 3, and is inclined at a predetermined angle θ relative to the axis of drive shaft 22, as shown. Pressure rollers 18 and 20 are of the self-aligning type such that when drive shaft 22 is rotated, pressure rollers 18 and 20 assume the same angle of inclination to the drive shaft 22 as steering roller 16, i.e., angle θ. The upper section 12 and lower section 14 of carriage 10 are connected by nut 24 and bolt 26. Set screws 28 and 30 also function to secure together the upper and lower carriage sections while coil springs 32 and 34 act continuously to draw the two carriage sections toward one another and to force inclined pressure rollers 18 and 20 into firm frictional engagement with the exterior of drive shaft 22.

In operation, drive shaft 22 is rotated by the energization of drive motor 32. The drive motor 32 is coupled to drive shaft 22 in any convenient manner i.e., an integral part of the drive shaft or by flexible coupling external of a bearing supported to a fixed base. The rotation of drive shaft 22 initiates the linear motion of the actuator 10. The principle that a roller, engaging a rotating shaft, having its axis inclined to the axis of that shaft, will be propelled in the direction of the shaft axis, is described in U. S. Pat. No. 2,204,638. The free end of drive shaft 22 is not supported, for reasons which will be explained hereinafter, the three rollers forming the free end shaft support.

The steering roller 16 is maintained at the selected angle θ by proper mounting of the roller using preloaded bearings.

The steering roller 16 is rigidly mounted using back-to-back preloaded bearings which resists radial, axial, or moment movement. The spring loaded rollers 18 and 20, which apply pressure to drive shaft 22, have sufficient moment freedom such that their angle of inclination is self-aligning to the angle θ dictated by the steering roller. This can be implemented by using self-aligning bearings for the pressure rollers 18 and 20.

In one embodiment of the invention the pressure rollers 18 and 20 are crowned to their own diameter i.e., they present a spherical surface to drive shaft 22. The use of this crown prevents the non-symmetrical compression the drive shaft 22 and steering roller 16 which occurs with cylindrically shaped pressure rollers. This non-symmetrical compression will generate forces to turn the pressure rollers 18 and 20 to the wrong lead angle, thereby creating drag effects and lead angle errors.

The linear actuator of the present invention is constructed such that only steering roller 16 determines the lead (rotational to translational ratio). The use of self-aligning bearings on the pressure rollers permits them to align with the inclination angle of the steering roller 16, thereby minimizing the effect of drag and lead errors.

The pressure rollers 18 and 20 must be aligned to the proper lead angle or they will cause a drag effect, possibly imparting lead variations. If a self-aligning ball bearing, or a conventional ball bearing having radial play or looseness is used as the pressure rollers, the outer race can align itself to rotate about the axis dictated by the driving force.

The ball bearing looseness can be achieved by using undersized balls. In such a bearing, the outer race has radial, axial and overturning moment play. The outer race can thus rotate about an axis which is in slight misalignment with the inner race.

A true self-aligning bearing is designed with a spherical outer race. This type of bearing is designed for applications where misalignments of bearing mountings can occur which must be compensated. The use of this type of bearing is not essential since the misalignments expected are readily accommodated by the looseness in a conventional ball bearing described hereinabove.

Since the drive shaft 22 is supported and self-aligning in two mountings (bearing at one end, inclined rollers on the other), it is not critical that drive shaft 22 be straight and parallel to the motion axis as with prior art methods. This follows since the threadless lead screw is used to impart motion to a device which moves along an axis defined by some form of guideways (not shown). It is desired that the lead screw develop thrust parallel to the axis of the guideway with little or no orthogonal thrust generated. If orthogonal thrusts are generated (due to improper design) components will yield and orthogonal moments will occur. In many applications, these orthogonal moments must be avoided.

The threadless lead screw of the present invention has one end of the shaft mounted to a fixed base, this mounting permitting a small degree of moment movement. The three rollers 16, 18 and 20 form the other shaft support. Since the shaft alignment is defined only by these two supports and a degree of freedom for moment movement is allowed, no orthogonal forces will be generated if ideal alignment or shaft straightness is not achieved.

In the prior art systems described hereinabove, a threaded drive shaft is usually mounted to two fixed base supports while the engaging nut is mounted to the moving part. Since the motion axis is defined by moving ways the line of travel of the nut is also defined. If the shaft is not straight or aligned to the axis of nut motion, orthogonal forces will be generated.

Figure 3:
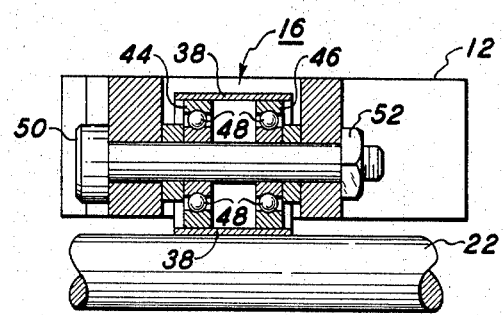
FIG. 3 is a cross-sectional view along line 3—3 of FIG. 2A illustrating the back-to-back, preloaded bearings acting upon the steering roller.
Figure 2A:
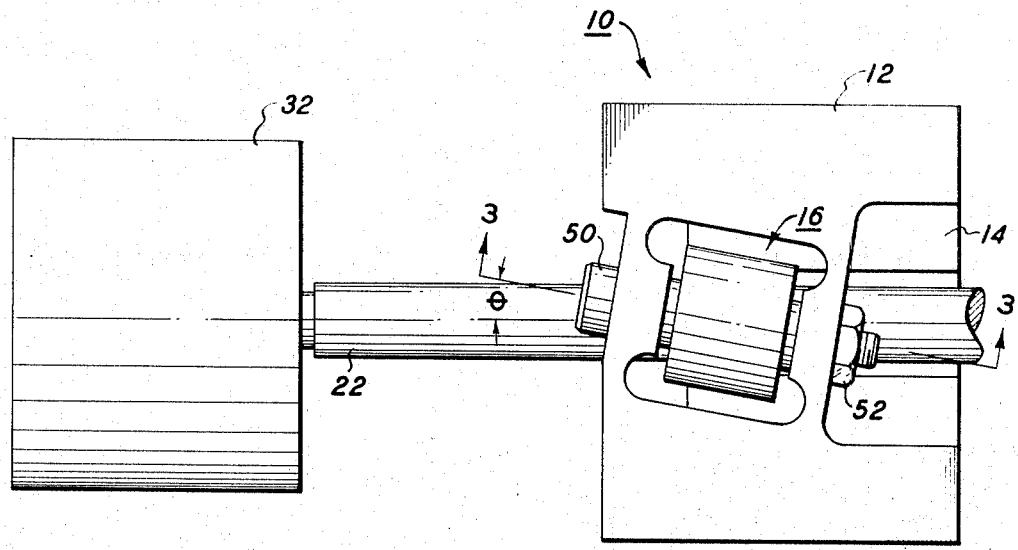
FIGS. 2A, 2B and 2C are plan, front and side elevation views, respectively, of the linear actuator, FIG. 2C being shown in partial cross-section.
Figure 2B:
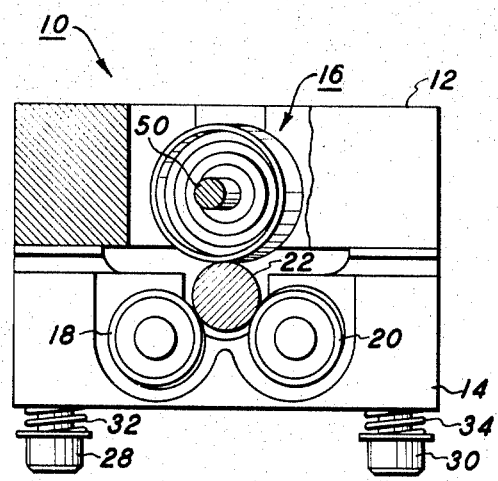
Figure 2C:
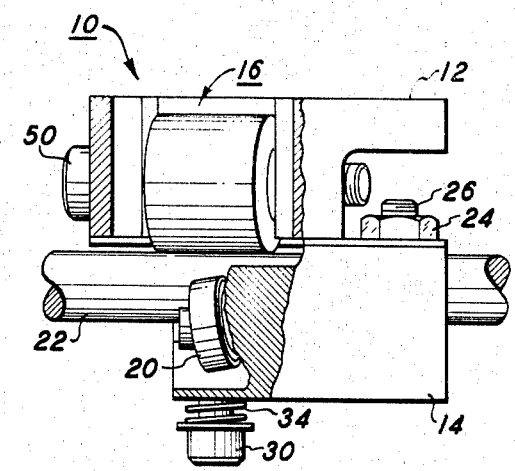

FIG. 3 is a cross-sectional view of the preloaded back-to-back bearings which make up the precision mounted roller 16 described in FIG. 1.

The steering roller 16 comprises sleeve 38 and back-to-back preloaded bearings 44 and 46 which include a plurality of ball bearings 48. Preloaded bearings are well known in the art and are described, for example in the General Catalog, published by New Departure, Division of General Motors Corporation, Bristol, Conn., Copyright 1961, 2nd printing 1963. Bearings 44 and 46 are mounted on bolt 50 as shown, the other end of bolt 50 being fastened by nut 52. Although bearings 44 and 46 are shown spaced apart along the bolt length, it should be noted that the bearings may be in contact. Utilization of the preloaded bearings as shown provides a precision mounted roller which is maintained at a predetermined angle and which is not permitted to vary.

While the invention has been described with reference to preferred embodiments thereof, it should be understood by those skilled in the art that various changes in form and details may be made without departing from the true spirit and scope of the invention. All such modifications, etc. are considered to be within the scope of the present invention as defined by the claims appended hereto.

What is claimed is:

1. Apparatus for translating rotational motion of a drive member into rectilinear motion of a carriage along the axis of the drive member comprising:
   a. a substantially cylindrical drive member, and
   b. a carriage member having first and second sections and a plurality of rollers supported by said sections, one of said rollers being supported at a fixed bearing angle to the longitudinal axis of said drive member by a shaft member which is immovably supported by said first carriage section, whereby said one roller will resist moment movement, each of the other of said rollers being movably supported by said second section such that said other rollers have sufficient moment freedom to self-align themselves with said drive member such taht they bear against said drive member at substantially said fixed bearing angle.

2. The apparatus of claim 1 wherein each of said other rollers is crowned to its own diameter.

* * * * *